(12) United States Patent
Graf

(10) Patent No.: US 9,927,284 B2
(45) Date of Patent: Mar. 27, 2018

(54) MONOLITHIC WEIGHING SYSTEM

(71) Applicant: Sartorius Lab Instruments GmbH & Co. KG, Goettingen (DE)

(72) Inventor: Winfried Graf, Niemetal (DE)

(73) Assignee: Sartorius Lab Instruments GmbH & Co. KG, Goettingen (DE)

( * ) Notice: Subject to any disclaimer, the term of this patent is extended or adjusted under 35 U.S.C. 154(b) by 202 days.

(21) Appl. No.: 14/884,890

(22) Filed: Oct. 16, 2015

(65) Prior Publication Data

US 2016/0033320 A1 Feb. 4, 2016

Related U.S. Application Data

(63) Continuation of application No. PCT/EP2014/000540, filed on Mar. 4, 2014.

(30) Foreign Application Priority Data

Apr. 16, 2013 (DE) .................. 10 2013 103 791

(51) Int. Cl.
*G01G 7/02* (2006.01)
*G01G 23/36* (2006.01)

(52) U.S. Cl.
CPC ............ *G01G 23/361* (2013.01); *G01G 7/02* (2013.01)

(58) Field of Classification Search
CPC ........... G01G 23/361; G01G 7/02; G01G 7/04
See application file for complete search history.

(56) References Cited

U.S. PATENT DOCUMENTS

| | | | |
|---|---|---|---|
| 3,805,907 A | 4/1974 | Knothe et al. | |
| 4,825,968 A * | 5/1989 | Maaz | G01G 7/04 |
| | | | 177/212 |
| 9,086,315 B2 * | 7/2015 | Metzger | G01G 23/48 |
| 2006/0096790 A1 | 5/2006 | Muehlich et al. | |

(Continued)

FOREIGN PATENT DOCUMENTS

| | | |
|---|---|---|
| DE | 3743073 A1 | 7/1988 |
| WO | 2004111583 A1 | 12/2004 |

OTHER PUBLICATIONS

International Search Report in counterpart International Application No. PCT/EP2014/000540, dated May 9, 2014.

(Continued)

*Primary Examiner* — Natalie Huls

(74) *Attorney, Agent, or Firm* — Edell, Shapiro & Finnan, LLC

(57) ABSTRACT

A monolithic weighing system including a base (12), a load holder (26), which is articulated on the base (12) through a parallel link arrangement (16, 20), and a lever (28), which is articulated on the load holder (26) and which has an attachment point for a force compensating arrangement and a target area (32) for an optical position sensor (34). The target area (32) has a slotted diaphragm (36) in a thin walled lever section of the lever (28) in the deflection plane thereof. A position sensor pedestal (38a, b), which is integrally connected to the base (12), is arranged laterally adjacent to the target area (32). The position sensor pedestal has a pedestal aperture (40a, b), which extends perpendicularly to the deflection plane. The slotted diaphragm (36) of the target area (32) is laser-machined through the pedestal aperture (40a, b).

4 Claims, 2 Drawing Sheets

(56) References Cited

U.S. PATENT DOCUMENTS

| | | | | |
|---|---|---|---|---|
| 2007/0034419 A1* | 2/2007 | Kuhlmann | ........... | G01G 21/244 |
| | | | | 177/136 |
| 2007/0193788 A1* | 8/2007 | Walter | ................. | G01G 21/244 |
| | | | | 177/212 |
| 2013/0220711 A1* | 8/2013 | Beguin | .................... | G01G 7/04 |
| | | | | 177/210 EM |

OTHER PUBLICATIONS

Office Action in corresponding German Application No. 10 2013 103 791.7, dated Jan. 30, 2014, along with a partial English translation.

English language translation of the International Preliminary Report on Patentability in counterpart International Application No. PCT/EP2014/000540, dated Oct. 22, 2015.

* cited by examiner

MONOLITHIC WEIGHING SYSTEM

CROSS REFERENCE TO RELATED APPLICATIONS

This is a Continuation of International Application PCT/EP2014/000540, which has an international filing date of Mar. 4, 2014, and the disclosure of which is incorporated in its entirety into the present Continuation by reference. The following disclosure is also based on and claims the benefit of and priority under 35 U.S.C. § 119(a) to German Patent Application No. DE 10 2013 103 791.7, filed Apr. 16, 2013, which is also incorporated in its entirety into the present Continuation by reference.

FIELD OF THE INVENTION

The invention relates to a monolithic weighing system, comprising a base, a load holder, which is articulated on a base via a parallel link arrangement, and a lever, which is articulated on the load holder and which has an attachment point for a force compensating arrangement and a target area for an optical position sensor, wherein the target area has a slotted diaphragm in a thin walled lever section of the lever in the deflection plane thereof.

Furthermore, the invention relates to a weighing device comprising a monolithic weighing system of this type.

BACKGROUND

Monolithic weighing systems as the core element of weighing devices are known to the person skilled in this art from precision balances, in particular, from precision balances that work on the principle of electromagnetic force compensation. Weighing systems of this type have a load holder, which is articulated on a base by a parallel link arrangement. In the resulting precision balance the load holder is connected to a weighing pan that holds samples to be weighed, whereas the base is fixed in position. The load holder is able to perform a strictly vertical motion, at least in the event of small deflections, due to the parallel link arrangement. A lever arrangement for transmitting the deflection of the load holder is articulated on the load holder. The lever arrangement is provided with an attachment point for a force compensating arrangement, for example, an electromagnetic moving coil arrangement. The force compensating arrangement is used to generate a counter force that acts on the lever arrangement and that compensates for the deflection of the lever arrangement, where the deflection is produced by the force of gravity acting on the load holder. In the event that the force compensating arrangement is designed as an electromagnetic moving coil arrangement, it is necessary to control a current through the moving coil in order to compensate for the force. The corresponding control circuit includes an optical position sensor that accurately detects the deflections of the lever arrangement, and the electronic control unit provides a corresponding signal, so that an immediate compensation can take place. With this approach it is possible to achieve the objective that the actual deflections of the lever arrangement can be minimized. To some extent it is referred to as a "path-free" force compensation.

The sensitivity of the position sensor is essential for precision weighing. In commercially available weighing systems the lever arrangement has a slotted diaphragm, which is monitored by an optical sensor, in a section of the lever that is designed as a thin wall and that is subject to a comparatively large deflection, in the plane of deflection. In particular, it has proven to be useful to arrange a slotted diaphragm of a thin walled lever section between a photo emitter and a photo detector, so that the light of the photo emitter transilluminates the slotted diaphragm on its way to the photo detector. In the event that the photo detector is suitably design as, for example, a split photodiode, the deflections of the lever section bearing the slotted diaphragm can be very accurately registered. For this purpose pedestals for mounting the photo emitter and the photo detector are required on both sides of the target area, i.e., the slotted diaphragm.

DE 37 43 073 A1 discloses a balance, in which the transmitter and the receiver of the optical position sensor are accommodated inside the magnet cover. Furthermore, U.S. Pat. No. 3,805,907 discloses a null-type indicator for a balance, in which for purposes of adjustment the light sensitive areas can be pivoted about the optical axis of the receiver.

For reasons relating to mechanical precision and repeatability, weighing systems of this type are manufactured, as far as possible, in a monolithic manner. That is, they are machined from a uniform block of material, such as aluminum. However, in the aforementioned weighing systems known from the prior art, the pedestals for mounting the position sensor can be manufactured separately and then subsequently screwed to the base. For reasons relating to precision, in particular the position sensor has to be positioned very close to the target area. However, the resulting spatial constraint does not allow the slotted diaphragm of the target area to be cut out with the milling and drilling tools that are used to make the rest of the monolith. On the other hand, however, the monolithic attachment of the position sensor pedestals would be especially important with respect to the primary goal of increasing the resolution and repeatability in the weighing area. Due to the limited repeatability of the position of the position sensor relative to the slotted diaphragm that can be achieved with existing manufacturing methods, the net result is, in particular, assembly inaccuracies and effects, such as temperature effects on the threaded connections.

SUMMARY

An object of the present invention is to provide an improved weighing system with position sensor pedestals that are connected in a monolithic manner.

In accordance with one formulation, this object is achieved in that a position sensor pedestal, which is integrally connected to the base, is arranged laterally adjacent to the target area; and that the position sensor pedestal is provided with a pedestal aperture, which extends perpendicularly to the deflection plane, wherein the slotted diaphragm of the target area is laser-machined through the pedestal aperture.

Preferred embodiments of the invention are the subject matter of the dependent claims.

According to a further formulation of the invention, the at least one pedestal, which is required to mount the position sensor, is cut out in a monolithic manner with the rest of the weighing system without taking into consideration the resulting problems, which are explained above, and, in particular, to arrange the pedestal on the base. According to an additional key feature of the invention, this pedestal is provided with a pedestal aperture, which can serve two purposes. First of all, it can serve to mount the position sensor. This is also the case with the known pedestals that are manufactured separately and then screwed on. In particular, the apertures may be adapted to the shape of the position sensor, so that the position sensor may be inserted into the one or more pedestals in a positively locking manner with the maximum degree of repeatability. According to the invention, however, the pedestal aperture is assigned an additional function, i.e., as a machining window for laser machining the target area, in particular, for cutting out the slotted diaphragm using a laser beam. This approach solves the problem of too high a spatial constraint for mechanically machining the target area. Therefore, in a first manufacturing step the weighing system, including the pedestal or the pedestals with the pedestal aperture, is cut in the conventional manner out of a block of material in a monolithic manner. Then in a second machining step the slotted diaphragm of the target area is cut out with a laser beam directed through the pedestal aperture. In a subsequent working step a weighing device may be provided, in that the monolithic weighing system is equipped with a position sensor and a force compensating arrangement. Such a weighing arrangement can then be expanded to form a precision balance, which is ready to use, by adding the weighing pans, the electronics and the housing.

Typically the target area of the lever arrangement is approximately in the center of the total height of the weighing system. The upper pair of links of the parallel link arrangement is typically positioned further up, while the lower pair of links of the parallel link arrangement is positioned further down. Since both the upper as well as the lower pair of links are articulated on the base, the target area and the one or more pedestals are consequently located between two walls of the base that extend beyond the height of the weighing system. Even these walls of the base can interfere with the machining of the target area as well as the pedestal or the pedestals.

Therefore, it is provided in a further development of the invention that a wall of the base is arranged adjacent to the pedestal bearing the pedestal aperture; and this wall of the base has a base aperture overlapping the pedestal aperture, where in this case the slotted diaphragm of the target area is provided by laser machining through the base aperture. In other words, the idea of laser machining through a machining window is also applied to the wall of the base. However, the base aperture can also be used as the entrance way for machining the pedestal mechanically. In particular, the base aperture and the pedestal aperture may be provided in one joint drilling operation. Then the resulting channel forms the entrance way for laser machining the target area.

Although there are many ways to form an optical position sensor, including the arrangement of an imaging detector on just one single pedestal, it is economically more practical and at least just as accurate to use, as already explained above, a photo emitter and a photo detector on both sides of a target area with a slotted diaphragm.

Therefore, it is provided in a further development of the invention that one pedestal each with a pedestal aperture is disposed on both sides of the target area; and that the pedestal apertures and the target area are aligned with each other. In the case that has already been explained above, where the walls of the base interfere with the mechanical and optical machining of the pedestals or more specifically the target area, this problem leads to the preferred embodiment, according to which the pedestals are disposed between two walls of the base, which has in each case a base aperture that overlaps the closest pedestal aperture.

The geometric shape of the slotted diaphragm is also very important for the sensitivity of the position sensor. In order to avoid reflections at the edges of the slotted diaphragm and, as a result, scattered light behind the slotted diaphragm, a situation that would lead to a reduction in the sensitivity of the position sensor, the aspired goal is to make edges at the rims of the slotted diaphragm that are as infinitely sharp as possible. These almost perfectly sharp edges are produced preferably by either making the slotted diaphragm very thin, for example, as very thin sheet metal, or wedge shaped, tapering off in the direction of the photo detector. A preferred slot width of the slotted diaphragm is in a range of about 0.3 to 0.5 mm.

Additional features and advantages of the invention will become apparent from the following specific description and the drawings.

BRIEF DESCRIPTION OF THE DRAWINGS

The drawings show in.

DETAILED DESCRIPTION

Figure 1:
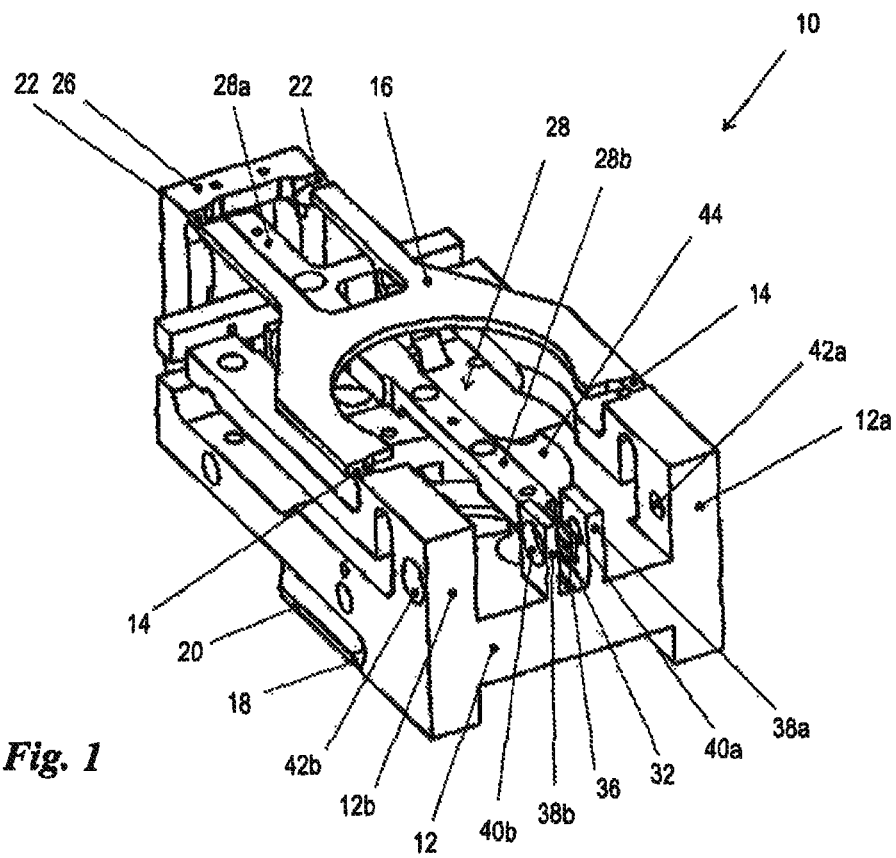
FIG. 1: a perspective view of a weighing system according to the invention.

Identical reference numerals in the figures denote the same or analogous elements.

Figure 2:
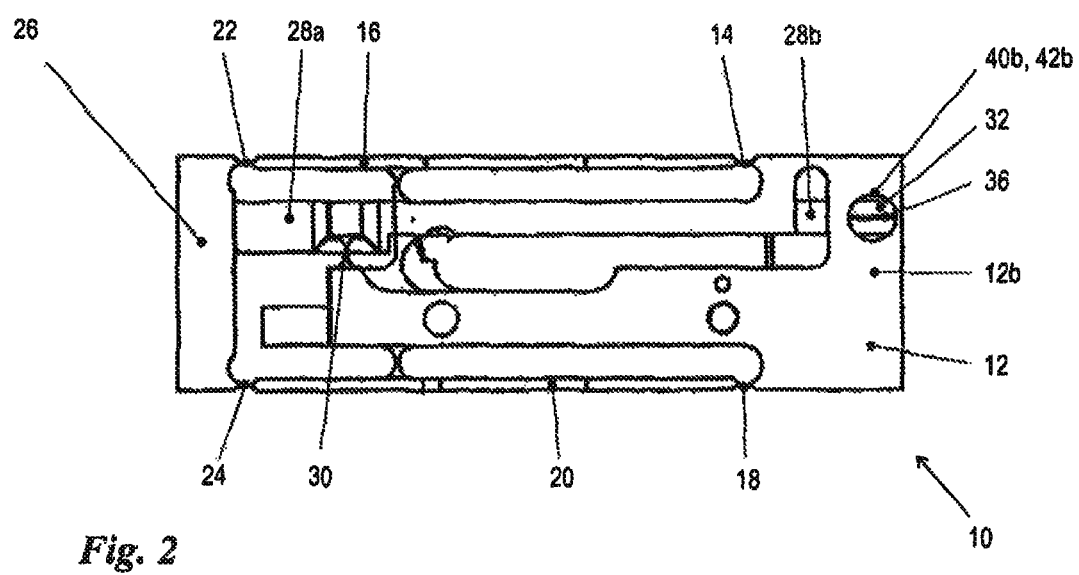
FIG. 2: a side view of the weighing system from FIG. 1.
Figure 3:
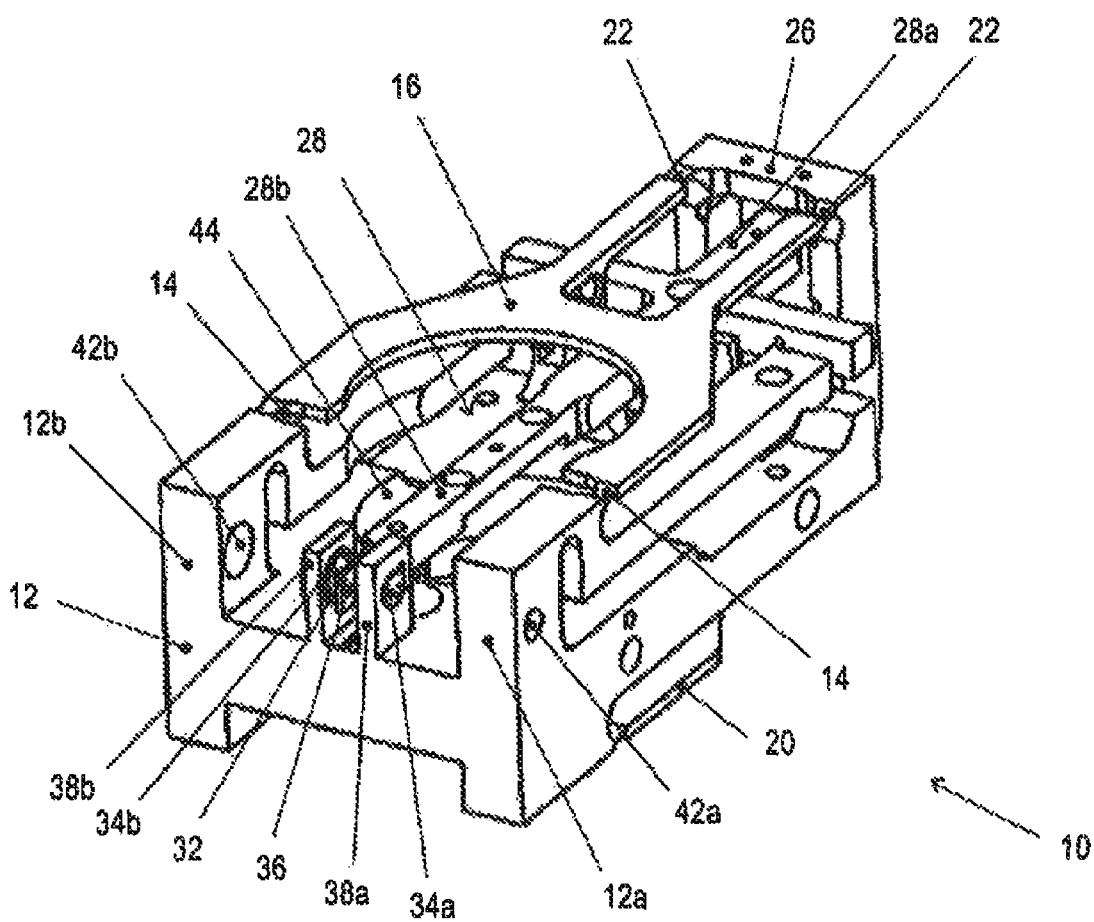
FIG. 3: a perspective view of a weighing device according to the invention.

The FIGS. 1 and 2 show an embodiment of an inventive weighing system 10 in a monolithic type of construction. FIG. 3 shows the same monolithic weighing system 10, which was expanded to include a position sensor. If the weighing system were to be expanded even more, in particular, by adding a force compensating arrangement, a suitable electronic unit, a weighing pan and a housing, the net result would be the provision of a balance that is ready for use. Therefore, the FIGS. 1 to 3 should be described together as follows, unless explicit reference is made to a specific drawing in the individual case.

The weighing system 10 is constructed in a monolithic manner, i.e. cut out of a block of material as one piece. Preferably this objective is achieved through the use of a block of aluminum that is as free of tension as possible. The machining is done predominantly mechanically, in particular, by milling and drilling, preferably with the use of programmed CNC machines.

The weighing system 10 has a base 12, which represents a fixed reference point with respect to all of the movements within the weighing system 10. An upper pair of links 16 is articulated on the base 12 via first weak spots 14. A lower pair of links 20 is articulated on the base 12 via second weak spots 18. The upper pair of links 16 and the lower pair of links 20 are articulated on a load holder 26 via third weak spots 22 and fourth weak spots 24 respectively, which can be seen only in FIG. 2. This parallel link arrangement allows, at least in the event of small deflections, a strictly vertical motion of the load holder 26 relative to the base 12. In a balance comprising the weighing system 10, the load holder 26 is connected to a weight holder, in particular, a weighing pan, so that a gravitational force that is to be measured is introduced into the weighing system 10 through the load holder 26.

The load holder 26 is connected via a coupling, which cannot be seen in detail in the figures, to a lever arrangement for transmission, in the embodiment shown, in particular, for the purpose of increasing the deflection of the load holder 26. The details of the lever arrangement and its coupling to the load holder 26 are not important for the present invention. Important is only the terminal lever 28, which can be functionally divided into a short lever arm 28a and a long lever arm 28b and which is pivotally mounted at its point of contact on a supporting point weak spot 30. A deflection of the load holder 26 is transmitted, depending on the embodiment of the lever arrangement, directly or indirectly to the short lever arm 28a and leads to a correspondingly increased deflection of the long lever arm 28b. The free end of the long lever arm 28b exhibits a target area 32 for a position sensor 34, which is described in more detail below. The target area 32 consists of a thin walled lever section, which performs the pivotal motion in the deflection plane of the lever 28 and has a slotted diaphragm 36 perpendicular thereto.

As indicated in FIG. 3, the position sensor 34 consists of a photo emitter 34a and a photo detector 34b. The photo emitter and photo detector are arranged in such a way that light from the photo emitter 34a on its way to the photo detector 34b transilluminates the slotted diaphragm 36 of the target area 32. If the photo detector is suitably designed, for example, as a split photodiode, then the deflections of the long lever arm 28b can be detected with a very high degree of accuracy. In order to mount the position sensor 34, the pedestals 38a, 38b are disposed on both sides of the target area 32. According to the invention, the pedestals are connected in one piece to the base; in particular, they are a component of the monolithic weighing system 10. Each of the pedestals 38a, 38b has a pedestal aperture 40a, 40b; and these pedestal apertures are aligned with each other; and in a non-deflected position of the lever 28, they are aligned with the slotted diaphragm 36 of the target area 32. These pedestal apertures 40a, 40b have a double function, i.e., on the one hand, to mount, in particular, by inserting the elements of the position sensor 34, as well as the machining window for laser machining the target area 32. If the target area 32 cannot be mechanically machined, in particular, by milling, due to the thinness of the walls, then it is no longer possible to introduce the slotted diaphragm 36 into the target area 32 through mechanical machining due to the spatial constraints caused by the monolithic pedestals 38a, 38b. Therefore, the invention provides that the slotted diaphragm 36 is formed by laser machining through the machining windows 40a, 40b.

In the embodiment shown, the base 12 is designed in the shape of an H in the cross section and has, in particular, side walls 12a, 12b, between which the pedestals 38a, 38b and the target area 32 lying between the pedestals are disposed. In principle, it is possible to reflect the laser beam, which is required for laser machining the target area 32, into the system through the pedestal apertures 40a, 40b by arranging a deflecting mirror in the interstitial space between the pedestals 38a, 38b and the side walls 12a and 12b respectively of the base 12. However, in the embodiment shown, the side walls 12a, 12b in turn are provided with base apertures 42a, 42b, which are aligned with the pedestal apertures 40a, 40b. Hence, the laser beam that is required for machining the target area 32 is introduced preferably through at least two machining windows, namely through the pedestal aperture 40a, 40b and the base aperture 42a, 42b. The person skilled in the art will recognize that a unilateral introduction of the laser beam will usually suffice. For this purpose preferably the larger pair of machining windows is selected, i.e., in the exemplary embodiment shown, the pair of machining windows comprising the pedestal aperture 40b and the base aperture 42b, their alignment with each other and with the slotted diaphragm 36 is very plain to see, in particular, in FIG. 2. Each of the two pairs of machining windows, each comprising a pedestal aperture 40a, 40b and a base aperture 42a, 42b, is made preferably in one common drilling step.

FIGS. 1 and 3 show in only a rudimentary manner a receiving area 44 of the base 12 for accommodating a force compensating arrangement, in particular, for accommodating a permanent magnet; and a moving coil, which is coupled to the long lever arm 28b, for the electromagnetic force compensation of the gravitational force, which is introduced through the load holder 26, is immersed in the magnetic field of the permanent magnet.

The embodiments that are discussed in the specific description above and shown in the figures constitute embodiments of the present invention that are shown solely for illustrative purposes. The person skilled in this art is provided a wide range of possible variations. In particular, the skilled person is free in the specific geometric design of the parallel link arrangement and the lever arrangement of the monolithic weighing system 10 according to the invention.

LIST OF REFERENCE SIGNS 10 weighing system
12 base
12a, b side walls of 12
14 first weak spots
16 upper pair of links
18 second weak spots
20 lower pair of links
22 third weak spots
24 fourth weak spots
26 load holder
28 lever
28a short arm of 28
28b long arm of 28
30 supporting point weak spot
32 target area
34 position sensor
34a photo emitter
34b photo detector
36 slotted diaphragm
38a, b pedestal
40a, b pedestal aperture
42a, b base aperture
44 magnet holder

What is claimed is:
1. A monolithic weighing system, comprising:
a base,
a load holder, which is articulated on the base through a parallel link arrangement, and
a lever, which is articulated on the load holder and which has an attachment point for a force compensating arrangement and a target area for an optical position sensor,
wherein the target area has a slotted diaphragm in a thin walled lever section of the lever in a deflection plane of the lever,
wherein a position sensor pedestal, which is integrally connected to the base, is arranged laterally adjacent to the target area,
wherein the position sensor pedestal has a pedestal aperture, which extends perpendicularly to the deflection plane,
wherein a side wall of the base is arranged adjacent to the position sensor pedestal that has the pedestal aperture, and the side wall of the base has a base aperture that overlaps with the pedestal aperture, and wherein the slotted diaphragm of the target area is laser-machined through the pedestal aperture and the base aperture.

2. A monolithic weighing system, comprising:

a base, a load holder, which is articulated on the base through a parallel link arrangement, and a lever, which is articulated on the load holder and which has an attachment point for a force compensating arrangement and a target area for an optical position sensor, wherein the target area has a slotted diaphragm in a thin walled lever section of the lever in a deflection plane of the lever, wherein a position sensor pedestal, which is integrally connected to the base, is arranged laterally adjacent to the target area, wherein the position sensor pedestal has a pedestal aperture, which extends perpendicularly to the deflection plane, wherein the slotted diaphragm of the target area is laser-machined through the pedestal aperture, wherein a respective position sensor pedestal is arranged on each side of the target area and each position sensor pedestal has a pedestal aperture, such that the pedestal apertures and the target area are aligned with each other, and wherein the position sensor pedestals are disposed between two side walls of the base, and each of the side walls has a base aperture that overlaps with the pedestal aperture that is disposed closest to the respective base aperture.

3. The monolithic weighing system, as claimed in claim 2, wherein a photo emitter, which is aligned with the target area, is inserted into the pedestal aperture of a first of the two position sensor pedestals, and a photo detector, which is aligned with the target area, is inserted into the pedestal aperture of a second of the two position sensor pedestals.

4. The monolithic weighing system, as claimed in claim 2, wherein the slotted diaphragm of the target area is laser-machined through both the pedestal aperture and the base aperture.

* * * * *